US 9,267,812 B1

United States Patent
Sachdev et al.

(10) Patent No.: US 9,267,812 B1
(45) Date of Patent: Feb. 23, 2016

(54) PARKING OPTION

(71) Applicants: Vineet Sachdev, Millersville, MD (US); Kathryn Flynn, Arnold, MD (US)

(72) Inventors: Vineet Sachdev, Millersville, MD (US); Kathryn Flynn, Arnold, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/566,394

(22) Filed: Dec. 10, 2014

Related U.S. Application Data (60) Provisional application No. 62/037,914, filed on Aug. 15, 2014.

(51) Int. Cl.
*G01C 21/36* (2006.01)

(52) U.S. Cl.
CPC .................... *G01C 21/3685* (2013.01)

(58) Field of Classification Search
CPC ........... G01C 21/3685; G01C 21/3679; G01C 21/3605; G01C 21/3614; G01C 21/3635; G01C 21/3694
See application file for complete search history.

(56) References Cited

U.S. PATENT DOCUMENTS

| | | | |
|---|---|---|---|
| 8,665,118 B1 | 3/2014 | Woodard et al. | |
| 2001/0025222 A1* | 9/2001 | Bechtolsheim .... | G01C 21/3423 701/410 |
| 2009/0289109 A1* | 11/2009 | Sims et al. ..................... | 235/380 |
| 2012/0136997 A1 | 5/2012 | Yan et al. | |
| 2012/0143639 A1 | 6/2012 | Rollert et al. | |
| 2013/0143536 A1 | 6/2013 | Ratti | |
| 2013/0158853 A1* | 6/2013 | Li et al. .......................... | 701/400 |
| 2014/0058711 A1* | 2/2014 | Scofield ........................... | 703/6 |
| 2014/0248911 A1* | 9/2014 | Rouda, Jr. .................. | 455/456.3 |
| 2014/0278081 A1* | 9/2014 | Iwuchukwu .................. | 701/519 |
| 2014/0302875 A1* | 10/2014 | Beaurepaire et al. ...... | 455/456.3 |
| 2014/0320318 A1* | 10/2014 | Victor et al. ............... | 340/932.2 |
| 2015/0066545 A1* | 3/2015 | Kotecha et al. .................. | 705/5 |
| 2015/0123818 A1* | 5/2015 | Sellschopp ........ | G01C 21/3484 340/932.2 |
| 2015/0187213 A1* | 7/2015 | Amir .................. | G01C 21/3685 340/932.2 |

OTHER PUBLICATIONS

Chen, et al.: "*Crowdsourcing for On-Street Smart Parking*"; Proceedings of the second ACM international symposium on Design and analysis of intelligent vehicular networks and applications. ACM, 2012.

Denner: "*Parking App for Easily Finding Available Spots*"; published May 9, 2014, https://www.youtube.com/watch?v=dgS-bOvkgKE.

Davami, et al.: "*Crowdsourcing Parking Lot Occupancy Using a Mobile Phone Application*"; 2014 ASE Bigdata/Socialcom/Cybersecurity Conference, Stanford University, May 27-31, 2014; ISBN: 978-1-62562-000-3.

\* cited by examiner

*Primary Examiner* — Rodney Butler

(74) *Attorney, Agent, or Firm* — Tarolli, Sundheim, Covell & Tummino, LLP (57) ABSTRACT

A navigation application can be configured to output a navigation map corresponding to directions to a selected point of interest (POI). The navigation application can also be configured to detect that a location of an end-user device is within a predetermined parking proximity of the selected POI. The navigation application can further be configured to provide a request to a navigation server for parking options associated with the selected POI.

7 Claims, 6 Drawing Sheets

PARKING OPTION

CROSS-REFERENCE TO RELATED APPLICATION

This application claims the benefit of priority to U.S. Provisional Application No. 62/037,914, filed on Aug. 15, 2014, and entitled POINT OF INTEREST PARKING, the entirety of which is herein incorporated by reference.

TECHNICAL FIELD

This disclosure relates to a navigation application that can request parking options associated with a point of interest.

BACKGROUND

A position tracking device is a device that can employ a Global Navigation Satellite System (GNSS), such as the Global Positioning System (GPS), GLONASS or other system such as a wireless carrier network to determine a precise location of a vehicle, person or other asset to which the position tracking device is attached to and/or located in and to record the position of the asset at regular intervals. The recorded location data can be stored within the position tracking unit, or recorded location data may be transmitted to a central location database or an internet-connected computer, using a cellular data connection such as the general packet radio service (GPRS) (e.g., a 2G or 3G data network), a 4G Long Term Evolution (LTE) network, Short Message Service (SMS) messages, radio or satellite modem embedded in the position tracking device, etc. This allows the asset's location to be displayed against a map backdrop either in real-time or when analyzing the track later, using tracking software. Position tracking software (e.g., a navigation application) is available for end-user devices, such that an end-user device can execute a navigation application that can operate as a position tracking device (e.g., a smartphone).

A parking lot, also known as a car lot, is a cleared area that is intended for parking vehicles. Usually, the term refers to a dedicated area that has been provided with a durable or semi-durable surface. In most countries where cars are the dominant mode of transportation, parking lots are a feature of every city and suburban area. Shopping malls, sports stadiums and similar venues often feature car parks of immense area. As an alternative, in many instances, street parking (e.g., parking at a parking meter or other curbside parking) is often available in urban areas.

SUMMARY

One example relates to a non-transitory machine readable medium having machine executable instructions comprising a navigation application, the navigation application can be configured to output a navigation map corresponding to directions to a selected point of interest (POI). The navigation application can also be configured to detect that a location of an end-user device is within a predetermined parking proximity of the selected POI. The navigation application can further be configured to provide a request to a navigation server for parking options associated with the selected POI.

Another example relates to a navigation server comprising one or more computing devices, the navigation server can be configured to determine a parking option for a selected POI in response to a request from a particular end-user device. The navigation server can also be configured to provide parking data characterizing the parking option to the particular end-user device. The navigation server can further be configured to receive a parking data update from each of a plurality of end-user devices that characterizes an availability of parking in a corresponding parking area.

Yet another example relates to a method that can include determining that an end-user device is within a predetermined parking proximity of a selected point of interest (POI). The method can also include providing a request for parking options for the selected POI to a navigation server in response to the determining. The method can further include outputting a parking option that characterizes parking data received in response to the request for parking options, wherein the parking data characterizes an expected availability of parking at a parking area.

DETAILED DESCRIPTION

This disclosure is related to a navigation application executing on an end-user device to assist a user with finding parking for a vehicle. The navigation application can be configured to output a navigation map corresponding to directions to a selected point of interest (POI). The navigation application can detect that a location of an end-user device is within a predetermined parking proximity of the selected POI. In response, the navigation application can provide a request to a navigation server for parking options associated with the selected POI.

The navigation server can determine parking data that characterizes a parking status (e.g., an expected availability of parking, expected cost for parking (e.g., an amount of money), etc.) for a plurality of parking areas that are within a predetermined distance of the selected POI. The parking data can be provided to the end-user device. In response, the navigation application on the end-user device can output parking options that characterize the parking data. Upon arriving at a parking area, a user of the end-user device can provide a parking data update characterizing the parking status of a chosen parking area. In this manner, the navigation server can employ crowd sourcing to determine a substantially real-time parking status of a plurality of parking areas.

Figure 1:
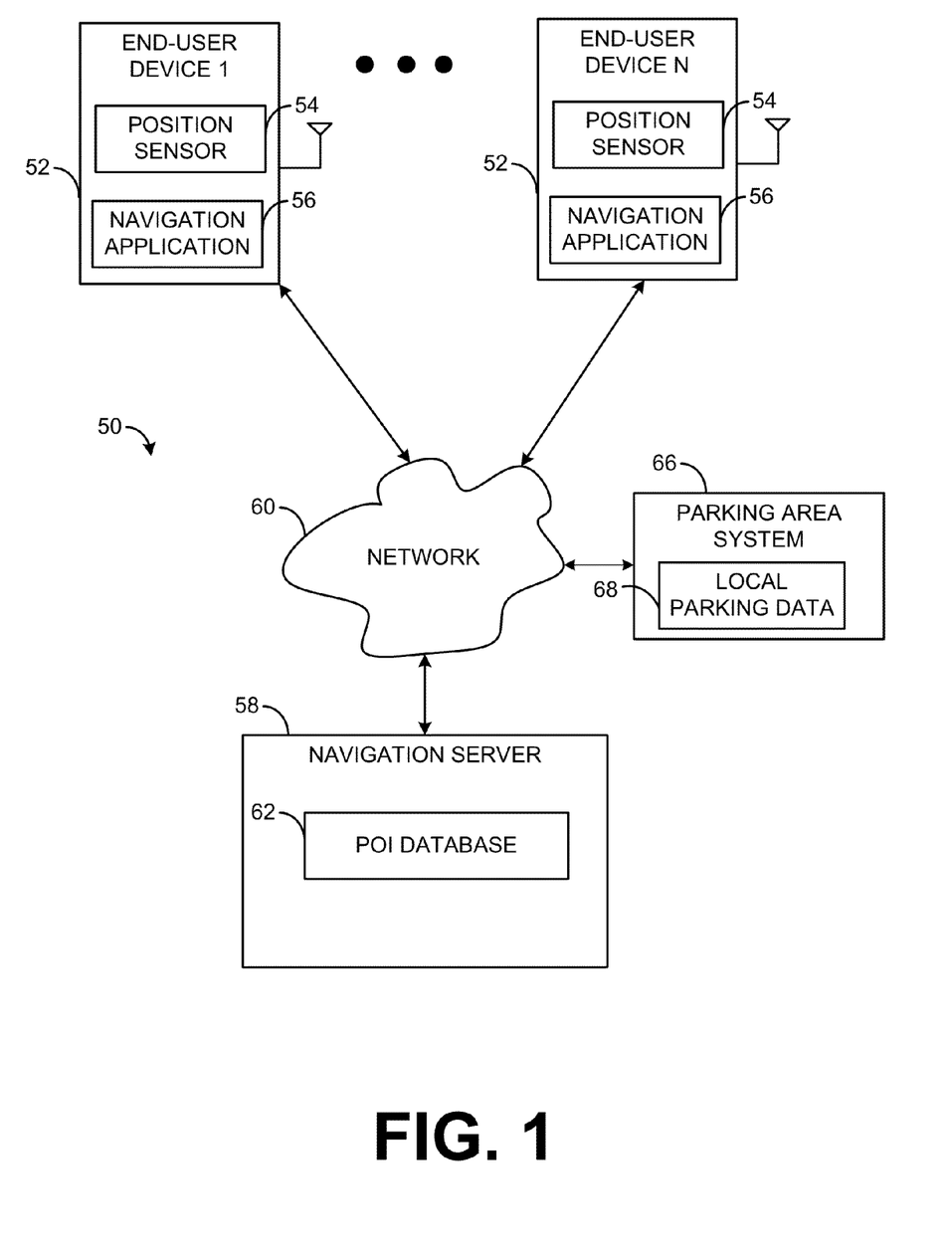
FIG. 1 illustrates an example of a system for assisting a user in finding parking options for a vehicle.

FIG. 1 illustrates an example of a system 50 to assist users finding parking for a vehicle proximal to a POI. The system 50 can include, for example, N number of end-user devices 52, where N is an integer greater than or equal to one. Each end-user device 52 can be implemented, for example, as a mobile device, such as a smartphone, a laptop or tablet computing device, a personal digital assistant (PDA), a wearable technology device (e.g., a smart watch) or a stand-alone position tracking device. In some examples, each end-user device 52 could be implemented as an in-dash vehicle navigation system (e.g., a head-unit). The end-user device 52 can include a position sensor 54 (e.g., a satellite position system) that can determine location information, such as a geographic location (e.g., latitude and longitude coordinates) of the associated end-user device 52. The position sensor 54 can be implemented, for example, as a Global Navigation Satellite System (GNSS), such as a Global Positioning System (GPS), a GLONASS system, etc. Each end-user device 52 can include a navigation application 56 that can receive the location information from the position locator 54 and generate a real-time map with an image (e.g., an icon) representing a real-time location of the end-user device 52. The navigation application 56 can be implemented, for example, as position tracking software.

The navigation application 56 can provide a user of a given end-user device 52 with a GUI that allows a user to select a POI (e.g., an address and/or a location, such as a hotel, a stadium, a monument, a park, etc.). The navigation application 56 can determine a travel route (e.g., directions) to the selected POI. Additionally, the navigation application 56 can communicate with a navigation server 58 via a network 60. The network 60 can represent, for example, a private network (e.g., a wireless carrier network), a public network (e.g., the Internet) or a combination thereof. The navigation server 58 can access a POI database 62 to retrieve a record associated with the selected POI. In some examples, the POI database 62 can be representative of multiple different databases. The record of the selected POI can include, for example, parking information associated with the selected POI. The parking information can include, for example, a list of parking areas that are within a predetermined distance of the selected POI. The navigation server 58 can also determine a substantially real-time parking status (e.g., an expected availability and expected cost, etc.) of each of the parking areas. In some situations, the parking status of each of the parking areas can be stored in the POI database 62. In other examples, the parking status of each of the parking areas can be stored in a different data store.

The navigation server 58 could be implemented, for example in a computing cloud. In such a situation, features of the navigation server 58, such as a processing unit, a network interface, and a memory could be representative of a single instance of hardware or multiple instances of hardware with applications executing across the multiple of instances (i.e., distributed) of hardware (e.g., computers, routers, memory, processors, or a combination thereof). Alternatively, the navigation server 58 could be implemented on a single dedicated server.

The navigation server 58 can combine the parking information associated with the selected POI with the parking status each parking area associated with the selected POI to form parking data for the selected POI. The parking data associated with the selected POI can be provided to the navigation application 56 of the given end-user device 52. The navigation application 56 can parse the parking data associated with the selected POI and output parking options via the GUI to the user characterizing the parking data once the given end-user device 52 is within a predetermined parking proximity of the selected POI. The parking options can include, but are not limited to an expected availability of parking for particular parking areas (e.g., parking garages) and/or parking spaces (e.g., street parking) as well as an expected cost (e.g., an amount of money needed for parking) of parking in the particular parking areas and a walking time from each particular parking area to the selected POI. The parking options can be displayed in a manner that resembles a "heat map" with colors indicating an expected availability of parking within a range. For instance, a first color (e.g., green) could represent an expected availability of parking of 20+ parking spaces, and a second color could (e.g., yellow) could represent an expected availability of parking of 10-19 parking spaces, etc.

The parking proximity can be spatial, such as a selectable distance between the given end-user device 52 and the selected POI. In some situations, the selectable distance can be selected in response to user input at the GUI. For instance, the parking options can be output to the user by the given end-user device 52 when the given end-user device 52 is about 1-5 miles or less from the selected POI. Additionally or alternatively, the parking proximity can be temporal, such that the parking proximity can correspond to an amount of time prior to an estimated time of arrival at an area proximal to the selected POI, which the estimated time of arrival can vary as a function of a the distance between the given end-user device 52 and a velocity of the given end-user device 52 relative to the selected POI. For instance, the parking proximity can be set to a time of about 3-10 minutes prior to the estimated time of arrival at the selected POI. As noted, upon reaching the parking proximity (temporal or spatial), the parking options characterizing the parking data can be output the user of the given end-user device 52.

Figure 2:
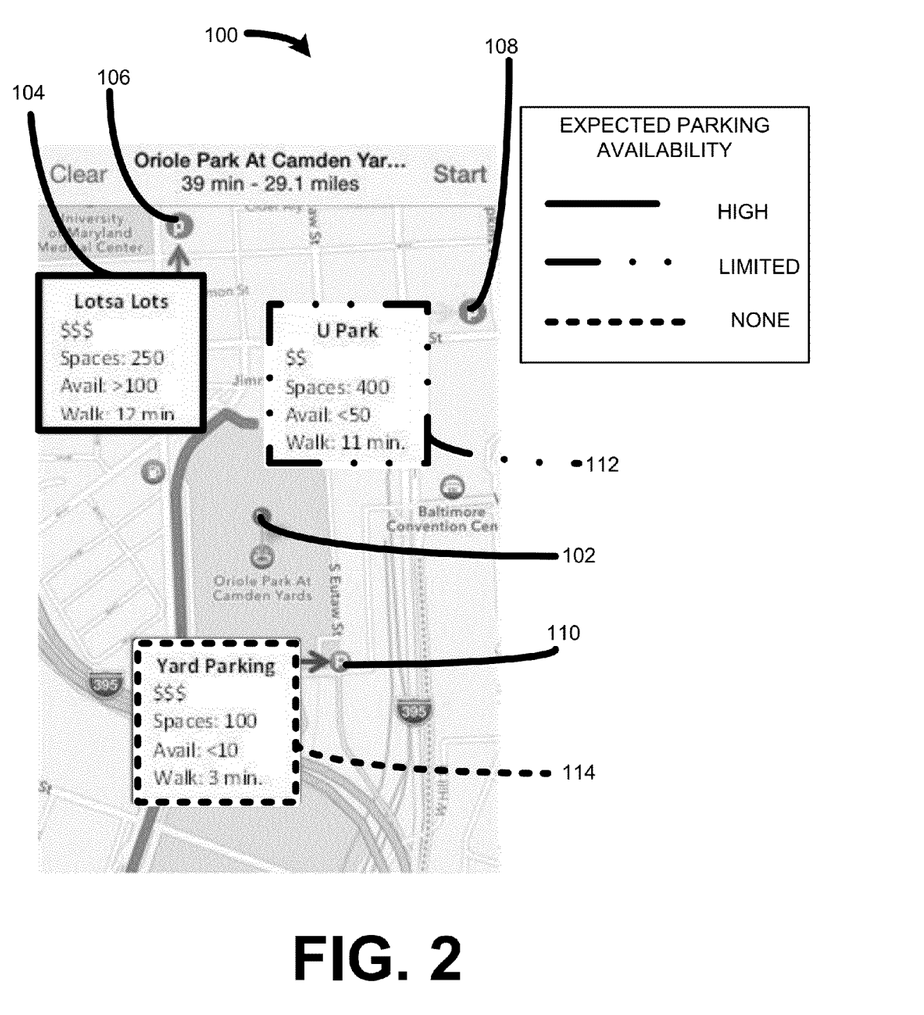
FIG. 2 illustrates an example of a screen shot that includes parking options.

FIG. 2 illustrates an example of a screen shot 100 of a GUI provided by a navigation application (e.g., the navigation application 56 of the given end-user device 52) displaying parking options for a selected POI (namely, Oriole Park at Camden Yards). An icon 102 representing the selected POI is output in the screen shot 100. Additionally, parking options that includes parking information for three different parking areas is also output in the screen shot 100. Parking information 104 for a first parking area 106 identified by an icon can include a name of the first parking area 106, such as a name of a parking lot (listed in FIG. 2 as "Losta Lots"). Additionally, the parking information 104 can include an indicator, such as a border pattern (or color) that quickly indicates the expected availability of the first parking area 106. For instance, the colors could operate in a manner similar to a "heat map". In such a situation, the colors can range from green indicating a high excepted parking availability (e.g., a range of 20+ expected available parking spaces) to yellow indicating a limited expected availability of parking (e.g., a range of 10-19 expected available parking spaces) to red indicating little-to-no expected availability of parking (e.g., a range of 0-9 expected available parking spaces). It is to be understood that the ranges for each color could correspond to a size of a particular parking area. Moreover, information such as an expected cost of the first parking area 106 can also be included in the parking information 104 (listed in FIG. 2 as "$$$"). Additionally, a numerical indicator of an expected number of available parking spaces in in the first parking area 104 can also be provided (listed in FIG. 2 as "Avail: >100"). Still further, information characterizing a walking time from the first parking area 106 to the selected POI can also be included in the parking information 104 (listed in FIG. 2 as "Walk: 12 min"). The parking options can also include second and third parking areas 108 and 110 that have similar parking information 112 and 114.

Referring back to FIG. 1, the display of the parking options can be configured by the user of the given end-user device 52. For example, priorities such as parking availability, cost and walking time to the POI after parking can be set as filter parameters of the parking options. Moreover, if further driving assistance is needed, in some example, the navigation application 56 of the given end-user device 52 can allow the user to choose a parking area of the parking options as a detour to the chosen parking area.

In some instances, after choosing a parking area, but prior to arriving at the chosen parking area, the expected availability of parking for the chosen parking area may change. For instance, if the selected POI is a stadium, the parking area may fill rapidly close to the time of an event. Thus, in some examples, the navigation application 56 can be configured to periodically (e.g., every minute) request updates to the parking data associated with the chosen parking area. In other examples, the navigation server 58 can be configured to detect that the expected availability of parking at the chosen parking area has changed and the navigation server 58 can push a notification to the navigation application 56 of the given end-user device 52 that indicates the change of the expected availability of parking. In either situation, the navigation application 56 can be configured to output text, a color change or other indicia to the user of the given end-user device 52 that characterizes the change in expected availability of parking at the chosen parking area. In response to such a change, the user of the given end-user device 52 may choose a different parking area.

Figure 3:
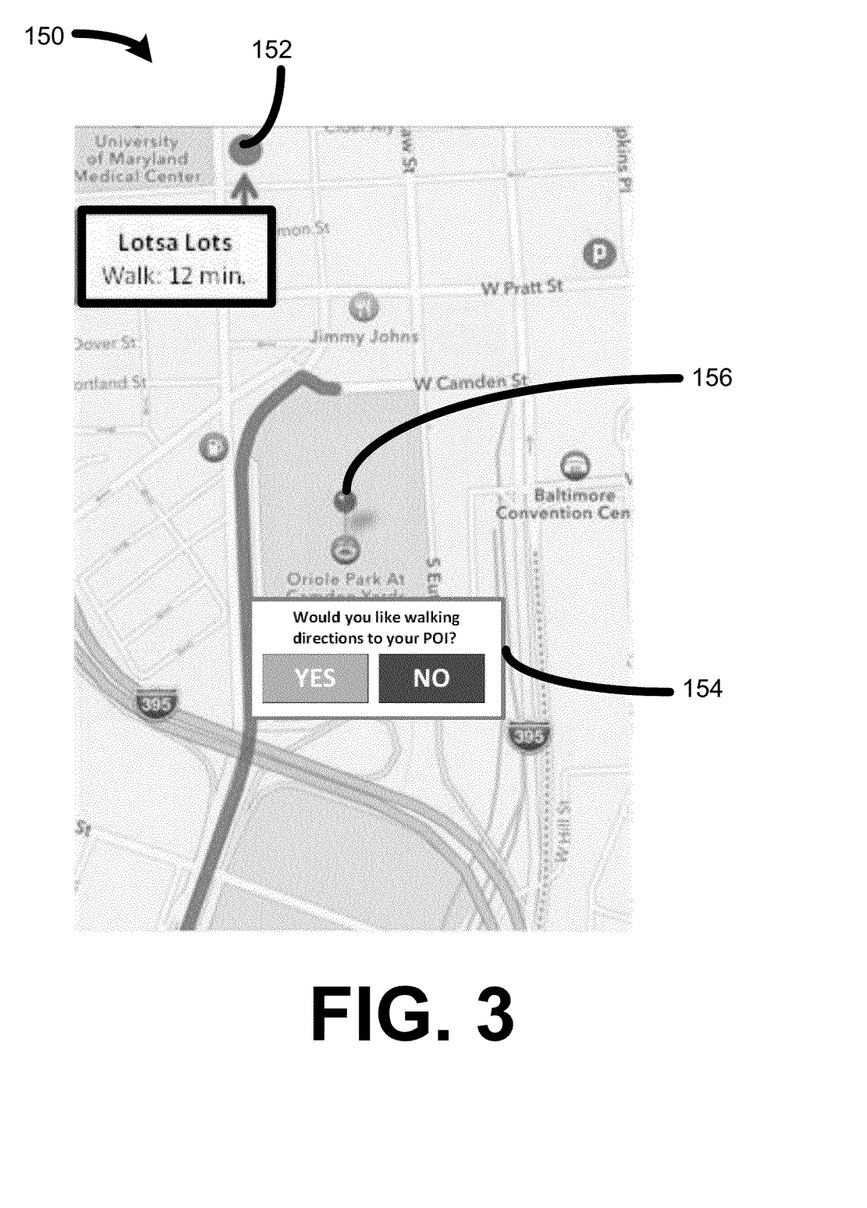
FIG. 3 illustrates an example of a screenshot of a prompt for walking directions.

Additionally, the navigation application 56 of the given end-user device 52 can detect the given end-user device 52 arriving at the chosen parking area and cease further traveling for a predetermined amount of time, thereby indicating a parking event (e.g., a vehicle parking). In such a situation, the navigation application 56 can prompt the user as to whether the user desires walking directions to the selected POI. FIG. 3 illustrates an example of a screen shot 150 of a GUI that could be provided by the navigation application 56 depicting such a prompt. For instance, upon arriving at a chosen (selected) parking area 152, a prompt 154 can be displayed allowing the user to accept or decline an invitation for walking directions from the chosen parking area 152 to a selected POI 156.

Referring back to FIG. 1, additionally or alternatively, upon the user of the given end-user device 52 arriving at the chosen parking area, the navigation application 56 can prompt the user for a parking data update (e.g., feedback) as to the accuracy of the parking information. Such parking data can include, for example, answers to questions as to whether the parking status (e.g., the expected availability, and/or the expected cost) provided had been accurate. Additionally, the parking data update can indicate if a change in the parking status has occurred. The parking data update can be provided to the navigation server 58. The navigation server 58 can process the parking data update and update the parking information associated with the selected POI in the POI database 62 accordingly.

Additionally, a parking data update can be received from any of the N number of end-user devices 52. For example, a navigation application 56 of another end-user device 52 can allow a user to select another POI (or the same POI). Upon the other end-user device 52 arriving at a location within walking distance (e.g., about 1 mile or less) of the selected POI and the navigation application 56 of the other end-user device 52 determining that movement of the other end-user device 52 has ceased, the navigation application 56 can prompt the user for a parking data update that can be sent to the navigation server 58. The parking data update can include, for example, answers to questions related to whether the user has found a parking spot and a nature of the parking spot (e.g., a garage or street parking). The parking data update can also include answers to questions as to the availability of other parking spots in proximal location to the other end-user user device 52. The parking data update can also include answers to questions as to the cost of parking at the parking spot, as well as an expected amount of time the user plans on parking in the parking spot.

The parking data update and identification of the selected POI can be provided to the navigation server 58. The navigation server 58 can retrieve a record associated with the selected POI and augment the record with the parking data. In this manner, the parking data associated with the selected POI can be collected from many different end-user devices 52 (e.g., crowd sourcing).

Additionally or alternatively, parking data for a particular parking area (e.g., local parking data) can be received from other sources, such as a parking area system 66. The parking area system 66 can be representative of a computing system that can track (e.g., substantially in real-time) a parking availability of a parking area (e.g., a parking garage or a parking lot) which availability can be stored and updated as local parking data 68. For instance, the parking area system 66 can monitor the status of parking sensors (e.g., proximity sensors and/or cameras) that can monitor a vacancy status of each parking space (or some subset thereof) in the associated parking area. The local parking data 68 can be provided from the parking area system 66 to the navigation server 58 via the network 60. The local parking data 68 of the parking area system 66 can be employed to augment the parking data.

The navigation server 58 can employ data received from the N number of different end-user devices 52 (including a parking data update) and other sources (including the parking area system 66) to derive parking information (e.g., a list of parking areas) associated with the selected POI as well as the parking data that includes the parking information and the parking status (e.g., the expected availability and cost, etc.), wherein the parking data characterizes the aforementioned parking options provided for the selected POI. Moreover, the parking data can be continually updated in real-time to reflect the ever changing status (e.g., change in expected availability, cost, etc.) of the parking options. Furthermore, the navigation server 58 can also employ the parking data associated with the selected POI to derive parking information and/or parking data associated with other POIs that are within a predetermined vicinity (e.g., 1 mile) of the selected POI.

By employment of the system 50, a user of any of the N number of end-user devices 52 can be given accurate parking options while en route to a POI. Moreover, the navigation server 58 can accurately and inexpensively track a substantially real-time parking status of a plurality parking areas.

Figure 4:
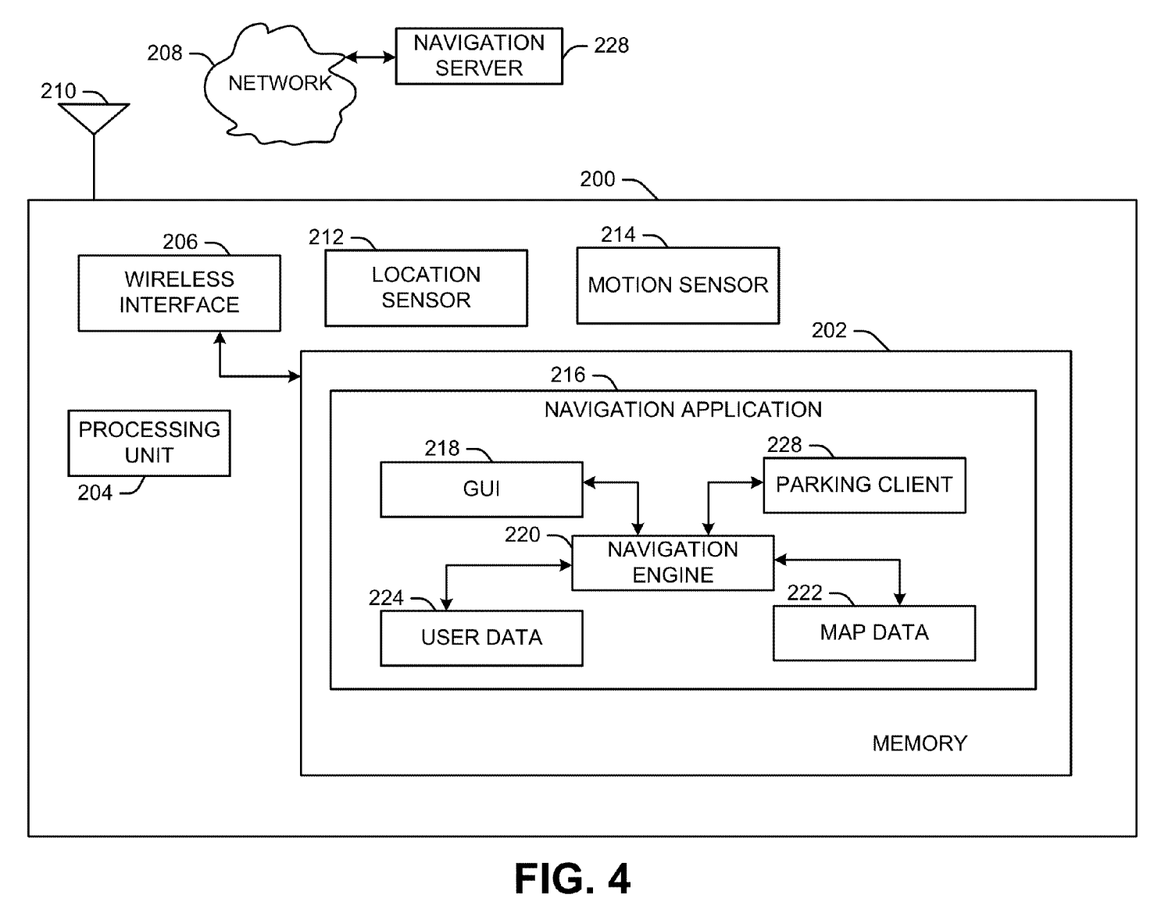
FIG. 4 illustrates an example of an end-user device for assisting a user in finding parking options for a vehicle.

FIG. 4 illustrates an example of an end-user device 200 that can provide assistance in finding a parking option for a vehicle during travel to a POI. The end-user device 200 could be employed, for example, as a given end-user device 52 of the N number of end-user devices 52 of FIG. 1. The end-user device 200 could be implemented, for example, as a mobile device, such as a smart phone, a feature phone, a wearable technology device (e.g., a smartwatch), a tablet computer, etc. In some examples, the end-user device 200 could be implemented in-dash vehicle navigation system. The end-user device 200 can include a memory 202 to store data and machine readable instructions. The memory 202 can be implemented, for example, as a non-transitory machine readable medium. In some examples, the memory 202 can include volatile memory (e.g., random access memory) and/or non-volatile memory, such as flash memory, a solid state drive a hard disk drive or a combination thereof. The end-user device 200 can also include a processing unit 204 configured to access the memory 102 and execute the machine readable instructions. The processing unit 204 can include one or more processor cores.

The end-user device 200 can include a wireless interface 206 that can communicate with a network 208 via an antenna 210. The wireless interface 206 can communicate via a standard wireless communication protocol, such as a protocol of a carrier network, Wi-Fi, Bluetooth, etc. The network 208 could be representative of a carrier network, such as a Long Term Evolution (LTE) network, a 4th Generation (4G) network, a 3rd Generation Partnership Project (3GPP), a 3rd Generation (3G) network, etc. Additionally or alternatively, the network 208 can be representative of a public network, such as the Internet.

The end-user device 200 can further include a location sensor 212. The location sensor 212 can be configured to determine location information for the end-user device 200. The location information can be implemented as longitude and latitude coordinates of the end-user device 200. In some examples, the location information can be based on received radio frequency (RF) signals that are transmitted from satellites (e.g., GNSS satellites). In other examples, the location information can be based on a triangulation of RF signals received from cell towers at the antenna 210.

In some examples, the end-user device 200 can include a motion sensor 214, such as an accelerometer. The motion sensor 214 can provide motion data (e.g., acceleration data) that can be employed to calculate a velocity vector (speed and heading) of the end-user device 200.

The memory 202 can include a navigation application 216 (e.g., a position tracking application) that can include a GUI 218 that can provide the user of the end-user device 200 with an option to select a POI (e.g., an address and/or a location, such as a hotel, a monument, a park, etc.). The navigation application 216 can include a navigation engine 220 that can access map data 222 and determine location information (e.g., latitude and longitude coordinates) for the selected POI. The map data 222 can be, for example, a table or database that stores locations, corresponding addresses and maps, etc. In some situations, the map data 222 can include data that covers a region (e.g., a city, a country, a continent, etc.). In such a situation, the map data 222 can represent a relatively small cache of data that can be updated (e.g., fetched) on an as-needed basis from an external system (e.g., the navigation server 222 or other system) to reflect a current location of the mobile device 200. In other examples, the map data 222 can include data that covers the entire earth.

The navigation engine 220 can receive current location information from the location sensor 212 that characterizes a current location of the end-user device 200. The navigation engine 220 can access the map data 222 and determine a travel route (e.g., driving directions) for the end-user device 200 from a current position to a position of the selected POI. The navigation engine 220 can also receive the motion data from the motion sensor 214 to determine a velocity vector (e.g., speed and heading) of the end-user device 200 based on the motion data and the location information. Moreover, in some examples, the velocity vector can be determined by the navigation engine 220 based only on (multiple instances of) location information.

The navigation engine 220 can cause the GUI 218 to output a navigation map depicting a substantially real-time position (e.g., as an icon on the map) of the end-user device 200. The navigation engine 220 can also determine an estimated arrival time at the selected POI based on the current position of the end-user device 200, the velocity of the end-user device 200 and the travel route to the selected POI. The estimated arrival time can be updated in real-time to reflect changing conditions (e.g., traffic conditions, driving velocity, an updated travel route), etc.

The GUI 218 can also provide the user with a mechanism to select a parking proximity for the selected POI and store the selected parking proximity as user data 224. The parking proximity can be a temporal proximity and/or a spatial proximity. For instance, the parking proximity can be set to a specific distance from the selected POI (e.g., 3 miles). Additionally or alternatively, the parking proximity can be set to a specific amount of time prior to an estimated time of arrival (e.g., 5 minutes). The navigation engine 220 can be configured to detect a point (e.g., a location or a time) at which the end-user device 200 reaches the parking proximity.

Upon reaching the parking proximity, the navigation engine 220 can cause the GUI 218 to prompt the user to determine if the user would like parking options for the selected POI. If the user selects an affirmative option (e.g., YES), the navigation engine 220 can employ a parking client 226 that can be configured to send a request (e.g., a query) to a navigation server 228 for parking information for the selected POI. The navigation server 228 can be implemented, for example, as the navigation server 58 illustrated in FIG. 1. In response, the navigation server 228 can determine parking data for the selected POI. The navigation server 228 can provide the parking client 226 with the parking data that characterizes parking options for the selected POI. The parking data can be forwarded to the navigation engine 220. The navigation engine 220 can cause the GUI 218 to output parking options on the navigation map based on the parking data for the selected POI. The parking options could be presented, for example, in a manner similar to those illustrated in FIG. 2. As explained with respect to FIG. 2, the parking options can include, for example, an expected availability of parking, an expected cost, a walking distance, etc. for each of the parking options, or some subset thereof. In some examples, some of the information included in the parking options (e.g., the walk time) can be calculated by the navigation engine 220. The user can choose one of the parking options (or another options) and travel to the chosen parking area.

Additionally, the GUI 218 can allow the user of the end-user device 200 to control display of the parking options. For example, priorities such as parking availability, cost and walking time to the POI after parking can be set as filter parameters of the parking options. Moreover, if further driving assistance is needed, in some example, the GUI 218 and the navigation engine 218 can allow the user to choose a parking area of the parking options as a detour from the selected POI to the chosen parking area.

Upon detecting parking event (e.g., at the chosen parking area), the navigation engine 220 can present the user with a questionnaire for a parking data update inquiring about the accuracy of the information included (e.g., availability, cost, etc.) in the parking data for the particular parking option chosen. The parking event can be triggered for example, by detecting that the end-user device 200 has ceased movement for a predetermined amount of time (e.g., 1 minute), which can indicate that the user has parked the vehicle and/or detecting that the end-user device 200 has arrived at a location of a particular parking area. The enterprise server 228 can update the parking data based on the parking data update.

Additionally, in some examples, such as situations where the end-user device 200 is implemented as a portable handheld device, the navigation engine 220 can cause the GUI 218 to output a prompt to determine if the user would like walking directions from the current location of the end-user device 200 (e.g., at the particular parking area) to the selected POI. If the user provides user input at the GUI 218 indicating that walking directions are desired, the navigation engine 220 can determine a walking travel route (which may be different from a driving travel route) to the selected POI. Thus, by employing the end-user device 200 and the navigation application 216, the user of the end-user device 200 can receive parking options for the selected POI while en route to the selected POI. In this manner, the user of the end-user device 200 can avoid the unwanted hassle of searching for a parking spot, thereby reducing the overall time needed to travel to the selected POI.

Figure 5:
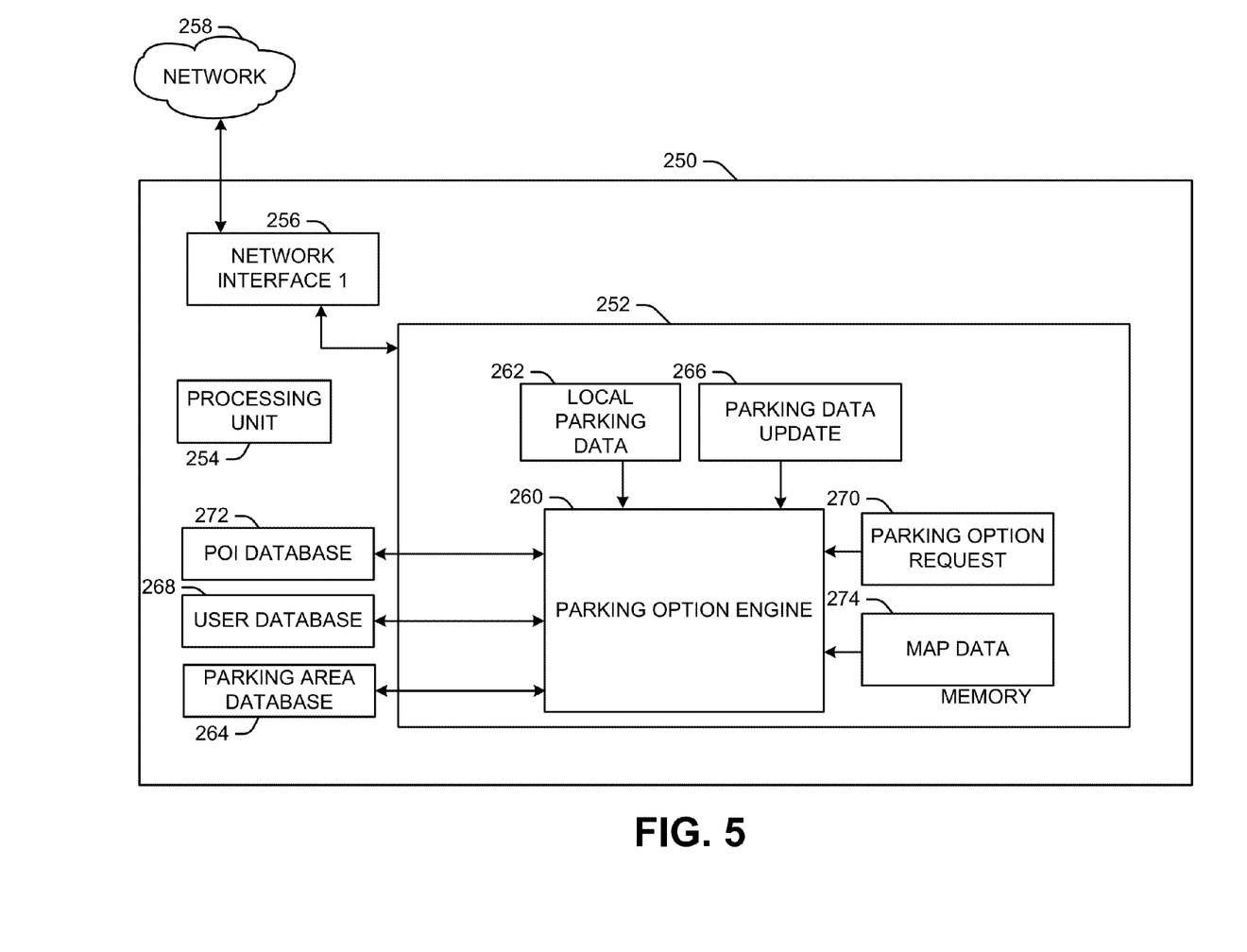
FIG. 5 illustrates an example of a navigation server for determining parking data.

FIG. 5 illustrates an example of navigation server 250 that could be employed, for example, as the navigation server 58 illustrated in FIG. 1. The navigation server 250 can include a memory 252 that can store machine readable instructions. The memory 252 could be implemented, for example, as non-transitory computer readable media, such as volatile memory (e.g., random access memory), nonvolatile memory (e.g., a hard disk drive, a solid state drive, flash memory, etc.) or a combination thereof. The navigation server 250 can also include a processing unit 254 to access the memory 252 and execute the machine-readable instructions. The processing unit 254 can include, for example, one or more processor cores. The navigation server 250 can include a network interface 256 configured to communicate with a network 258. The network interface 256 could be implemented, for example, as a network interface card. The network 258 could be implemented for example, as a public network (e.g., the Internet), a private network (e.g., a carrier network) or a combination thereof.

The navigation server 250 could be implemented, for example in a computing cloud. In such a situation, features of the navigation server 250, such as the processing unit 254, the network interface 256, and the memory 252 could be representative of a single instance of hardware or multiple instances of hardware with applications executing across the multiple of instances (i.e., distributed) of hardware (e.g., computers, routers, memory, processors, or a combination thereof). Alternatively, the navigation server 250 could be implemented on a single dedicated server.

The navigation server 250 can include a parking option engine 260 that can be configured to determine parking information (e.g., parking options and associated information) for each of a plurality of POIs or some subset thereof. The parking option engine 260 can receive local parking data 262 one or more parking area systems (e.g., the parking area system 66 illustrated in FIG. 1) via the network 258. Each instance of local parking data 262 can characterize a current state (or change) in parking availability at a corresponding parking area. In some situations, each such parking area system could be implemented in a parking garage or parking lot so as to monitor substantially real-time parking availability at the parking garage or lot. Data characterizing the local parking data 264 can be stored in a data store, such as a parking area database 264. In such a situation, the parking area database 264 can have records (or other kinds of entries) associated with each of a plurality of parking areas. Additionally, each record in the parking area database 264 can have an associated location.

Additionally, the parking option engine 260 can receive parking data update 266 via the network 258 that characterizes a perceived accuracy (or inaccuracy) of previously provided parking options. The parking data update 266 can be provided from a plurality of end-user devices, such as the N number of end-user devices 52 illustrated in FIG. 1. The parking data update 266 can characterize a parking availability of a parking area, a cost associated with the parking area, etc. Additionally, the parking data update 266 can include an expected time of return (e.g., a time of leaving) a particular parking spot. The parking area could be, for example, a parking garage, a parking lot, street parking, etc. In this manner, over time, the parking data update 266 forms crowd sourcing of information characterizing a substantially real-time availability of parking. Moreover, in some instances, the parking data update 266 may be unsolicited. In such a situation, the parking data update 266 can also include a description of a type of parking (e.g., lot parking or street parking). The parking option engine 260 can store the parking data update 266 in the parking area database 264. In some instances, the parking data update 266 can be employed to augment and/or update existing records in the parking area database 264 for each parking area. In other situations, the parking data update 266 can be employed to create new records in the parking area database 264.

Additionally, the parking option engine 260 can determine an identity of a user that provided a given instance of the parking data update 266. The parking option engine 260 can access a user database 268 and update a user rating included in a user record associated with the identified user. In this manner, if the same user provided many instances of parking data updates 266, the user rating associated with the user can be increased such that rewards (e.g., coupons, gifts, etc.) can be provided to the user to incentivize the user to provide accurate feedback. Additionally, in some situations, if the same user provides multiple instances of parking data update 266 that are determined to be largely inaccurate, the parking option engine 260 can access the user database 268 and decrease the user rating, once again providing an incentive to the user to provide only accurate parking information.

The parking option engine 260 can also process a parking option request 270 (e.g., query) that can be provided from an end-user device (e.g., the end-user device 52 of FIG. 1 and/or the end-user device 200 of FIG. 4) via the network 258. The parking option request 270 can be a query for parking options for a selected POI. In response, the parking option engine 260 can access a POI database (or other data store) 272 that can include a record for each of a plurality of POIs. The record associated with the selected POI can retrieved from the POI database 272 by the parking option engine 260. In some examples, the record associated with the selected POI can include a list of one or more parking areas, which can be referred to as parking information. Additionally or alternatively, the parking option engine 260 can access map data 274 to determine parking areas associated with the selected POI. The map data 274 can be similar to the map data 222 of FIG. 4. The parking information, including the associated parking areas listed in the POI database 272 and/or the parking areas determined by the parking option engine 260 can be, for example, a predetermined distance from the selected POI (e.g., within 2 miles). In some situations, the predetermined distance can be defined in the record associated with the selected POI. Moreover, in some situations, the POI database 272 and the parking area database 264 can be implemented as a single database.

Upon determining parking areas (or a single parking area) associated with the selected POI, the parking option engine can access the parking area database 264 to retrieve each record associated with a corresponding parking area. As noted, each record can contain substantially real-time parking status (e.g., parking availability, a total number of parking spots, a cost, etc.) associated with each parking area. Additionally, in some situations, the parking option engine 260 can determine an estimated walk time from a given parking area to the selected POI based on the map data 274. Alternatively, as noted, the walk time may be calculated at an end-user device. The parking option engine 260 can determine parking data for the selected POI that characterizes the list of parking areas associated with the selected POI as well as a corresponding parking status at each of the parking areas. The parking data for selected POI can be provided to the end-user device from which the parking option request 270 originated. Thus, a user of the end-user device can be provided substantially real-time parking options while en route to the selected POI.

Figure 6:
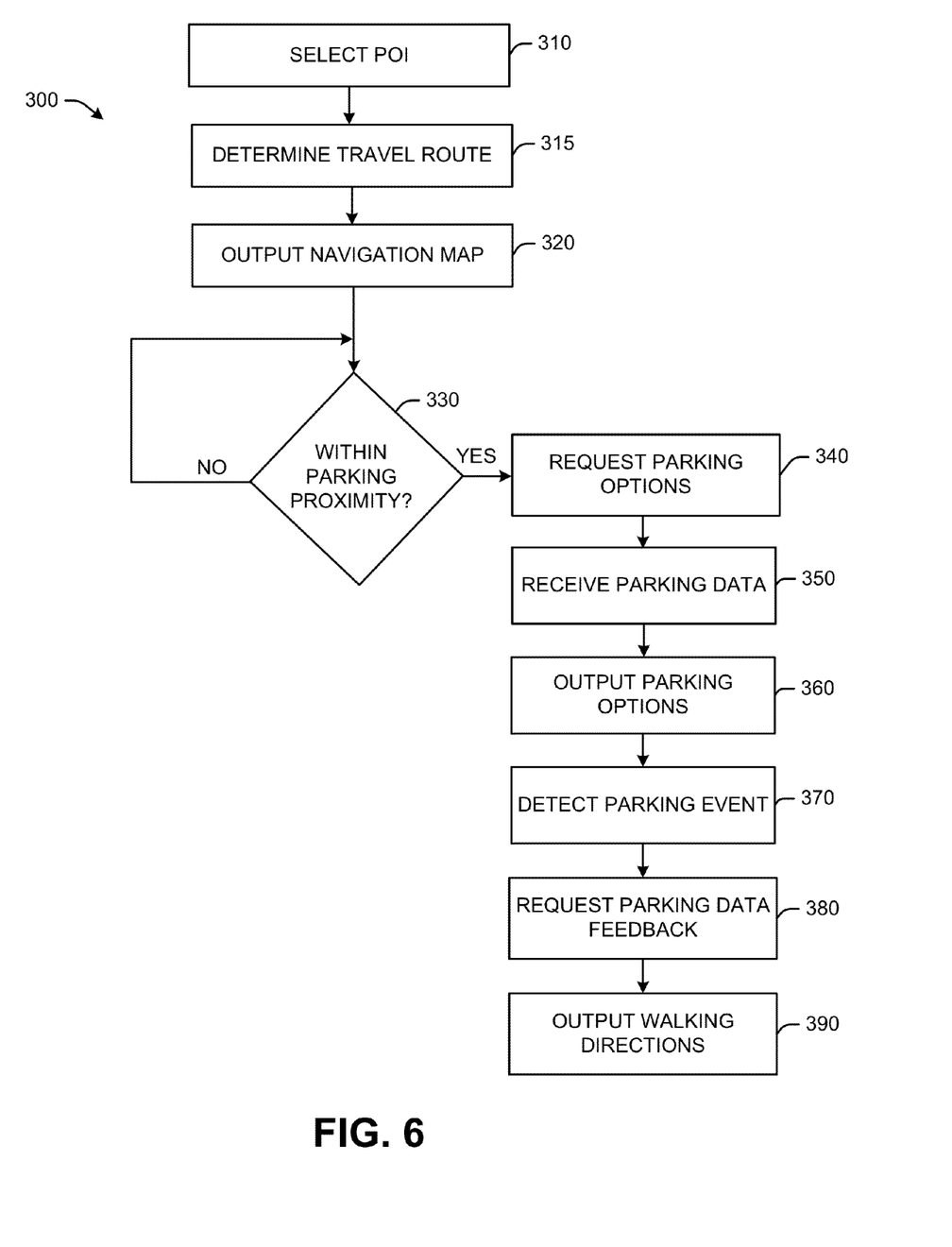
FIG. 6 illustrates a flowchart of an example of a method for finding parking options for a vehicle.

In view of the foregoing structural and functional features described above, example methods will be better appreciated with reference to FIG. 6. While, for purposes of simplicity of explanation, the example methods of FIG. 6 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example methods of FIG. 6 can be implemented as instructions stored in a non-transitory machine-readable medium. The instructions can be accessed by a processing resource (e.g., one or more processor cores) and executed to perform the methods disclosed herein.

FIG. 6 illustrates an example flowchart of a method 300 for providing accurate (e.g., substantially real-time) parking options for a vehicle. The method 300 can be implemented, for example, by an end-user device (e.g., the end-user device 52 of FIG. 1 and/or the end-user device 200 of FIG. 4) that includes a navigation application (e.g., the navigation application 216 of FIG. 2) executing thereon. At 310, a POI can be selected by the navigation in response to user input at the end-user device. At 315, the navigation application can determine a travel route to the selected POI from a current location of the end-user device. At 320, the navigation application can output a navigation map to the user of the end-user device. The navigation map can include a substantially real-time position of the end-user device represented as an icon on a map based on the travel route.

At 330, a determination can be made by the end-user device as to whether the end-user device is within a parking proximity of the selected POI. The parking proximity can be, for example a spatial proximity (e.g., within a certain distance of the selected POI) and/or a temporal proximity (e.g., an amount of time prior to estimated time of arrival at the selected POI). If the determination at 330 is negative (e.g., NO), the method 300 can return to 330. If the determination at 330 is positive (e.g., YES), the method 300 can proceed to 340. At 340, a request (e.g., a query) for parking options near the selected POI can be provided to a navigation server (e.g., the navigation server 58) via a network. At 350, parking data provided from the navigation application can be received at the navigation application that characterizes parking options associated with the selected POI. At 360, parking options (e.g., as illustrated in FIG. 2) can be output by the navigation application to the user via the navigation map.

At 370, a parking event can be detected by the navigation application. The parking event can indicate that the vehicle in which the end-user device is located has been parked. At 380, the navigation application can provide a request for a parking data feedback (e.g., answers to a questionnaire) can be provided to the user of the end-user device requesting information relating to the parking status (e.g., availability, cost, etc.) of the parking. At 390, walking directions from a current location of the end-user device to the selected POI can be output to the user.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A navigation server comprising one or more computing devices, the navigation server being configured to:
   determine a parking option for a selected point of interest (POI) in response to a request from a particular end-user device;
   provide parking data characterizing the parking option to the particular end-user device;
   receive a parking data update from each of a plurality of end-user devices that characterizes an availability of parking of a corresponding parking area;
   identify a user associated with a given end-user device of the plurality of end-user devices that provided a particular parking data update;
   receive feedback from another end-user device that characterizes an accuracy of the particular parking data update; and
   set a user rating for the user based on the accuracy of the particular parking data update.

2. The navigation server of claim 1, the navigation server being further configured to receive local parking data from a parking area system that characterizes an expected real-time availability of parking at a particular parking area, wherein the expected real-time availability of parking characterizes a range of an expected number of available parking spaces at the particular parking area or an expected number available parking spaces at the parking area.

3. The navigation server of claim 1, wherein the parking option comprises a plurality of parking options that are each within a predetermined distance from the selected POI.

4. The navigation server of claim 1, wherein the parking data characterizes an expected cost associated with a parking area.

5. The navigation server of claim 1, wherein the parking data further characterizes a total number of parking spaces at the parking area.

6. The navigation server of claim 1, wherein the parking option corresponds to a parking lot or a parking garage.

7. The navigation server of claim 1, wherein the parking option corresponds to street parking.

* * * * *